United States Patent [19]

Sarle

[11] 4,142,608

[45] Mar. 6, 1979

[54] TURBOCHARGER LUBRICATION AND EXHAUST SYSTEM

[75] Inventor: Charles R. Sarle, Noblesville, Ind.

[73] Assignee: Wallace Murray Corporation, New York, N.Y.

[21] Appl. No.: 730,877

[22] Filed: Oct. 12, 1976

Related U.S. Application Data

[62] Division of Ser. No. 594,646, Jul. 10, 1975, Pat. No. 4,009,972.

[51] Int. Cl.² ............... F16N 39/00; F04B 17/00
[52] U.S. Cl. .................. 184/6.11; 60/39.08
[58] Field of Search ............ 184/6.11; 415/112, 110; 417/407; 60/39.08

[56] References Cited

U.S. PATENT DOCUMENTS

| | | | |
|---|---|---|---|
| 2,571,166 | 10/1951 | Rossetto | 184/6.11 |
| 2,609,065 | 9/1952 | Douglas | 184/6.11 |
| 3,017,230 | 1/1962 | Meermans | 184/6.11 X |
| 3,054,554 | 9/1962 | Buchi | 417/407 X |
| 3,147,913 | 9/1964 | Davies et al. | 184/6.11 X |
| 3,722,624 | 3/1973 | Buckland | 184/6.11 |
| 3,740,170 | 6/1973 | Miller | 417/407 |

Primary Examiner—David H. Brown
Attorney, Agent, or Firm—Thomas J. Greer, Jr.

[57] ABSTRACT

A turbocharger system. One impeller of the turbocharger is driven by exhaust gas from an internal combustion engine, the other impeller functions as a pump to either compress air or to pump air in order to convey granular material. The impeller wheels are spaced and are mounted at the ends of a common shaft. The shaft is continuously lubricated, the spent lubricant being fed to an oil sump (crankcase). The specific improvement is a pressure bleed passageway between the chamber which receives engine exhaust pressure and the oil exhaust line. The bleed allows a portion of engine exhaust to pass to the sump exhaust line and assist oil flow to the sump by virtue of a pressure differential. This action, in turn, inhibits spent oil from passing through the seals and passing into either or both impellers when oil sump (crankcase) pressure is higher than atmospheric or where there are unfavorable to gravity flow conditions existing in the oil return line. Another portion of the system bleeds air from a high pressure reservoir to the interior of the oil sump line to assist spent oil flow to the sump.

3 Claims, 3 Drawing Figures

TURBOCHARGER LUBRICATION AND EXHAUST SYSTEM

This is a division, of application Ser. No. 594,646 filed July 10, 1975, now U.S. Pat. No. 4,009,972.

This invention relates to a turbocharger system and more particularly to a construction for inhibiting undesired backflow of lubricating oil into a flow passage of the turbocharger.

The turbocharger is a device for utilizing the energy in the exhaust gases of an internal combustion engine. Generally, a turbocharger consists of two impeller blades mounted at opposite ends of a common shaft. Each impeller rotates within its own cavity and sub-casing of the turbocharger housing. One impeller functions as a fluid motor, the exhaust gases from the engine striking it, passing over and across the vanes thereof and expanding and into an exhaust chamber. This action is accompanied by a rotary force being applied to the vanes to thereby turn the motor impeller and the shaft to which it is attached. At the other end of the common shaft, the other impeller, termed the pump impeller, functions to draw ambient air in and increase its velocity and density and discharge it to a pressure chamber where the energy is now higher than the energy in the ambient air. This higher pressure air is now used in a variety of ways, such as to increase the flow of air into the engine to boost its power or to drive an auxiliary pump of some sort. One of the other purposes is the use of the air flow from the pump impeller to convey materials. The pump impeller thus functions to cause flow of the granular material in a line or conduit.

One common turbocharger construction includes an oil line coming into the turbocharger housing, feeding into bearings along the central or intermediate portion of the common shaft, and thence down through a lower portion of the housing and thence to an oil sump. The sump is often simply the crankcase of the engine. In this manner, there is a continuous flow of lubricating oil from an oil supply chamber to the bearings of the turbocharger and thence to the engine oil sump. It is apparent that build-up of pressure in the oil exhaust portion of this hydraulic circuit should be avoided. If the oil pressure becomes great enough in the exhaust portion, some of the oil may tend to enter the seal area immediately adjacent one or both of the impeller wheels and there is consequently the possibility that some of this oil will seep through these latter seals and thus become mixed with the hydraulic pathways associated with the impeller wheels.

According to the practice of this invention, a significant build-up of oil pressure in the exhaust portion of the lubrication line for the turbocharger is inhibited by the use of a bleed or seepage aperture in a seal which is associated with the motor impeller. In the case where the motor impeller is driven by exhaust gases of relatively high pressure, a part of that high pressure exhaust gas is permitted to escape through the bleed in the seal and thence into the exhaust portion of the lubrication chamber in the main housing. By virtue of this construction, the flow of oil from the exhaust to the sump chamber is assisted because of the tendency of the bled exhaust gas to carry the exhaust oil in the same direction while passing to the sump, due to a pressure differential.

According to another aspect of the practice of this invention, the hydraulic line leading from the turbocharger to the sump is provided with a scavenge tube. One end of the tube is inserted into the exhaust hydraulic line and the other end coupled to a source of pressure, as may be obtained, for example, from the brake air pressure reservoir of a vehicle provided with air brakes. A constant exhaust of air through the scavenge tube and a build up of pressure higher than that encountered in the engine oil sump assists in maintaining unidirectional flow from the turbocharger into the sump.

Figure 1:
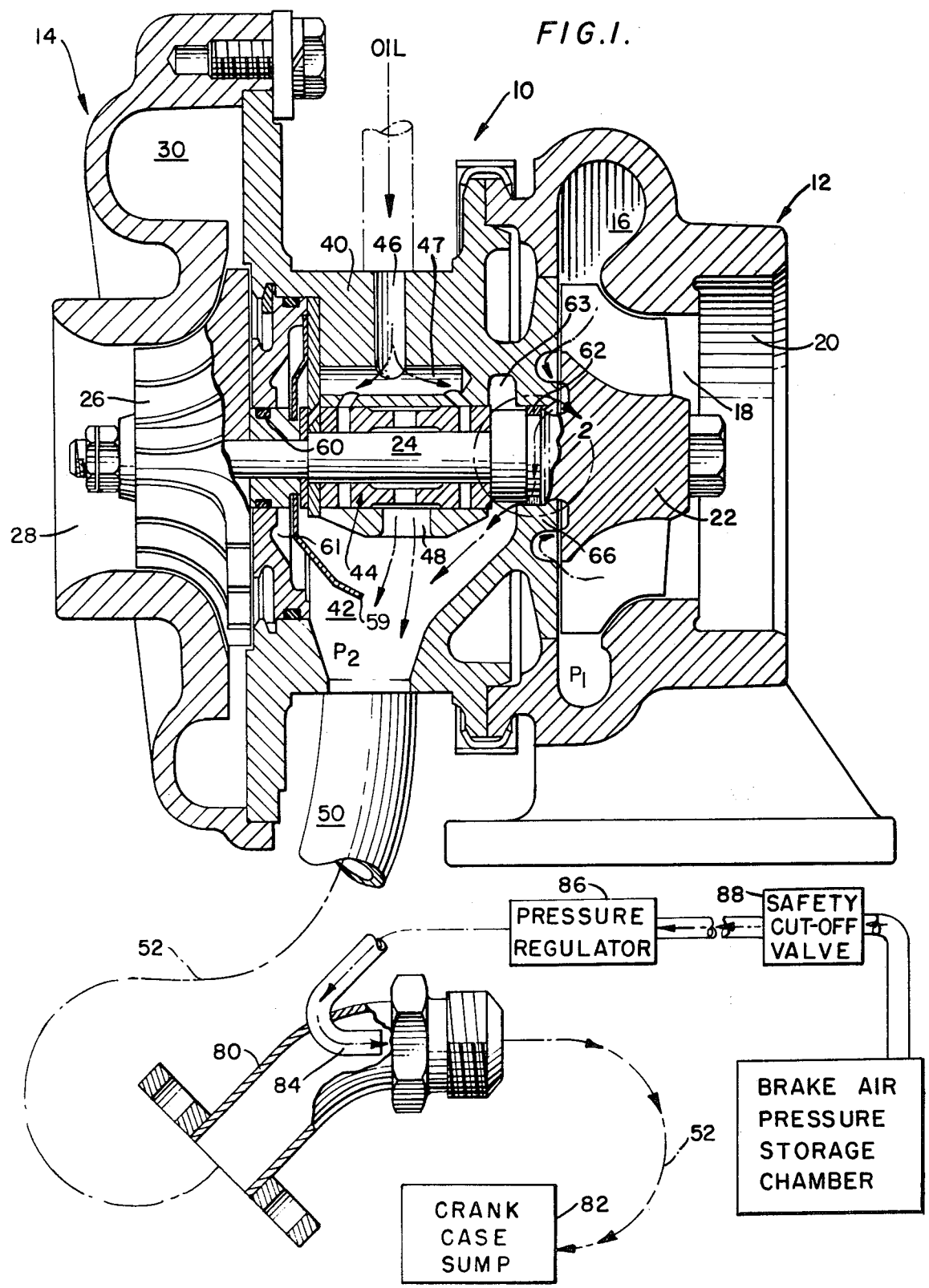
FIG. 1 is a partially schematic cross-sectional view illustrating the practice of this invention as applied to a turbocharger and also illustating another aspect of the invention as applied to the hydraulic line between the turbocharger and a crankcase sump.

Referring now to the drawings, the numeral 10 denotes generally a turbocharger which includes a main housing which includes sub-housing assemblies 12 and 14. Sub-assembly 12 is the motor impeller portion and includes input chamber 16 leading to exit chamber 18 which in turn communicates with exit mouth 20 through the spaces between the vanes on impeller 22. Shaft 24 is coupled to impeller 22, with the other end of shaft 24 coupled to an air pump impeller 26. Impellers 22 and 26 are of similar construction, each having a plurality of curved vanes known in the art. The numeral 28 denotes an air input mouth on sub-housing 14, the mouth communicating with annular output chamber 30.

The numeral 40 denotes a central housing portion of the turbocharger and includes a centrally disposed lubricant chamber 47 in which is positioned bearing assembly 44 for supporting the common shaft 24 within the turbocharger. Lubricant passage 46 communicates with an external supply of lubricant such as oil, the oil flowing in passage 46, into passages associated with shaft bearing structure 44 and thence exits through openings 48 into the input end of a sump or oil exhaust line 50. In turn, line 50 is a portion of hydraulic conduit 52 which leads from the lower portion of the turbocharger to a sump such as crankcase sump 82.

The numeral 60 denotes a seal positioned in the indicated annular groove in the left end of a bearing collar, to the left of an oil deflector 59. Seal 60 is illustrated as a single element, although it may also assume the form of a pair of conventional split ring type metallic seals. The function of seal 60 is to inhibit hydraulic communication, such as seepage, between the left portion of the common shaft bearing assembly, denoted by the numeral 61, and the cavity in sub-housing 14 in which impeller 26 rotates. A corresponding seal, denoted by the numeral 62, is located at the right portion of shaft assembly which includes common shaft 24 and is adjacent the motor impeller 22. Seal 22 is positioned between region 63 which communicates with chamber 42 and the cavity in sub-assembly 12 in which impeller 22 rotates.

Figure 2:
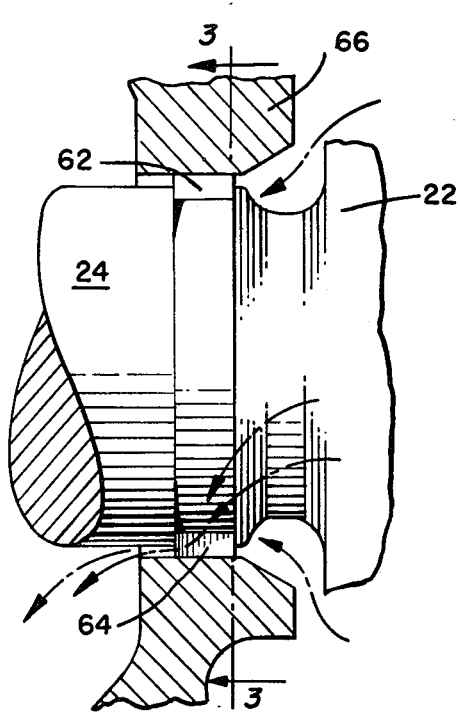
FIG. 2 is a partial cross-sectional view in the region of FIG. 1.
Figure 3:
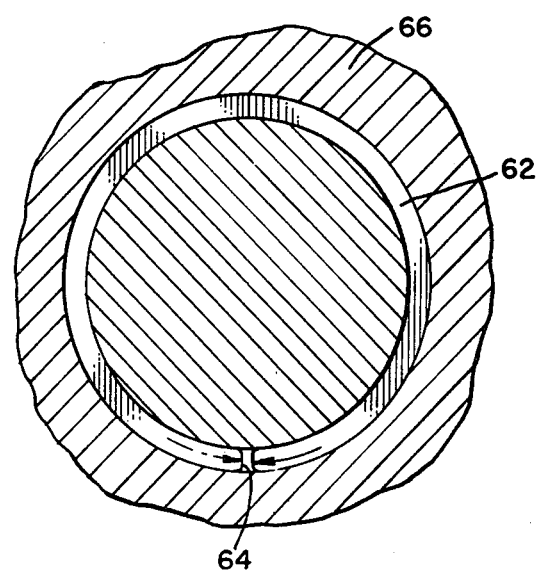
FIG. 3 is a view taken along section 3—3 of FIG. 2.

Referring now to FIGS. 2 and 3 of the drawings, the numeral 66 denotes that portion of housing 40 located between region 63 and impeller 22, the region having a circular opening to receive seal ring 62. The seal ring is in the form of a metallic piston ring, the ends of which are separated by a gap 64 to thereby define a bleed or seepage passageway between region 63 and the left central portion of the cavity in which impeller 22 rotates. It will be recalled that this cavity is contained in sub-housing assembly 12 and is therefore at the same pressure as the engine exhaust gases in input chamber 16. It will be noted that a continuous circumferential groove or channel is placed in that portion of common shaft 24 adjacent impeller 22, the groove receiving the radially innermost portion of seal metallic ring 62, the outermost radial portion of which snuggly bears against the periphery of the circular complementary opening in portion 66 of the housing.

The operation of the system thus Concurrently, lubricating described is as follows. The motor impeller commences operation by virtue of being impinged upon by exhaust gas in input chamber 16 from the engine by means of a suitable coupling not illustrated. The exhaust gas turns impeller 22, exits through mouth 20 from whence it is subsequently passed to atmosphere. Rotation of motor impeller 22 causes corresponding rotation of impeller 26, the latter either functions, for example, as an air pump or indirectly as a conveyor, both as discussed above. Concurrently, lubricating oil is fed from a suitable supply source into passageway 46 where it passes (as indicated by the arrows) into bearing assembly 44 which supports the central portion of common shaft 24. After passing through the indicted bearing assembly elements, the lubricant exits through aperture 48 and thence into the lower portion of chamber 42 and into the top of line 50. Ideally, the lubricant, without more, would simply fall by the action of gravity or by a pressure differential into hydraulic line 50 and into the sump 82. However, in some operating conditions, this is not always the case. The pressure in sump 82 will be such that it is higher than the pressure in the cavity 42 which receives lubricant from bearing assembly 44. In this circumstance, there will be a tendency for the spent oil to build up in cavity 42 thence to region or zones 61 and 63 and migrate past seals 60 and 62 and thus into the interior of sub-housing 14 or 12. This is obviously undesirable, particularly in the case wherein the fluid from impeller wheel 26 is used to convey materials. In this circumstance, oil would contaminate the hydraulic or conveyor circuit.

Another condition which may give rise to unwanted flow of the spent oil is that a build-up of pressure in sump 82 might inhibit the desired continuous flow of oil from passage 46 down to hydraulic conduit 50. Such undesirable oil flow behavior is inhibited by the present construction which permits a controlled hydraulic bleed between the lower portion of cavity 42 and the motor impeller 22. By virtue of this construction, such undesirable seepage of the oil is inhibited in the following manner. Exhaust gas at pressure $P_1$ is fed to pump impeller 22 in a manner above-described. A portion of this gas will pass through the bleed passage defined by gap 64 (see FIGS. 2 and 3) into chamber 42 which is at pressure $P_2$. This is for the case wherein $P_1$ is greater than $P_2$.

The practice of this invention also includes an additional apparatus for insuring that flow of the spent liquid lubricant exiting from chamber 42 flows towards the sump 82. The line 52 includes a tubular conduit section 80 which is provided with a short length of tubing 84, bent at its end in the indicated direction, the tubing in turn passing to a pressure regulator 86. The pressure regulator is serially connected to a safety cut-off valve 88, the valve in turn being coupled to an air pressure storage chamber in a motor vehicle air brake system. Typically, the air pressure reservoir chamber will be at a pressure of approximatley 125 lbs. per square inch, with the pressure regulator 86 dropping the pressure flowing from it to approximately 1 lb. per square inch. This latter pressure results in a continuous flow of air from small tube 84 into the interior of section 80 of the hydraulic exhaust line 52. The air flowing with the intended direction of lubricant in the line assists in inhibiting backward flow of the lubricant and to increase pressure in 52 to a higher pressure than crankcase 82. The function of the safety cut-off valve 88 is to prevent sudden loss of pressure from the air pressure reservoir in the air brake system of a vehicle should the pressure regulator 86 malfunction or if line breakage should occur. In the case of such a malfunction, the safety cut-off valve insulates the brake pressure and thereby prevents its decrease to dangerously low pressures.

From the above, the reader will recognize that the bleed technique shown at the bottom portion of FIG. 1 may be used in conjunction with or independently of the first-described split ring bleed construction.

In a typical installation, given by way of example only, the split metal seal ring 62 in the turbocharger 10 was about one inch in diameter and the gap 64 about 0.03 inch. The gap distance may vary in the range between 0.02 and 0.06 inches. The diameter of the impeller wheels 22 and 26 was about three inches. When the elements 80, 84 are employed in conjunction with the seal bleed gap 64 for the impeller 10, the maximum crank case pressure is about twelve inches of water and the flow rate of air in tube 84 (at the pressure given previously) is in the range of 0.6 to 1.5 cubic feet per minute.

What is claimed is:

1. A turbocharger system including a turbocharger having a lubrication exit chamber through which lubricating oil passes to discharge after passing through and lubricating rotary elements of the turbocharger, a hydraulic line leading from the lubrication exit chamber to a sump, a source of gas under pressure, the gas being of a higher pressure than the pressure in the hydraulic line, the improvement comprising, a tube inserted into the hydraulic line, the tube bleeding the said gas under pressure to said hydraulic line at a portion thereof intermediate said lubrication exit chamber and said sump, and in a flow direction towards said sump, and in the same direction as the flow of oil from the lubrication exit chamber to the sump, whereby oil is assisted to flow towards the sump, and whereby backward flow of lubricant is inhibited.

2. The turbocharger system of claim 1 wherein said source of gas under pressure is an air pressure storage chamber of a vehicle brake system.

3. The turbocharger system of claim 2 including safety cut-off valve and a pressure regulator between said storage chamber and said hydraulic line.

* * * * *